March 24, 1959 — T. A. DEL PAPA — 2,878,803
UTENSIL RETAINER STOVE GRILL
Filed Dec. 14, 1955 — 3 Sheets-Sheet 1

Torello A. Del Papa
INVENTOR.

BY *Clarence A. O'Brien
and Harvey B. Jacobson*
Attorneys

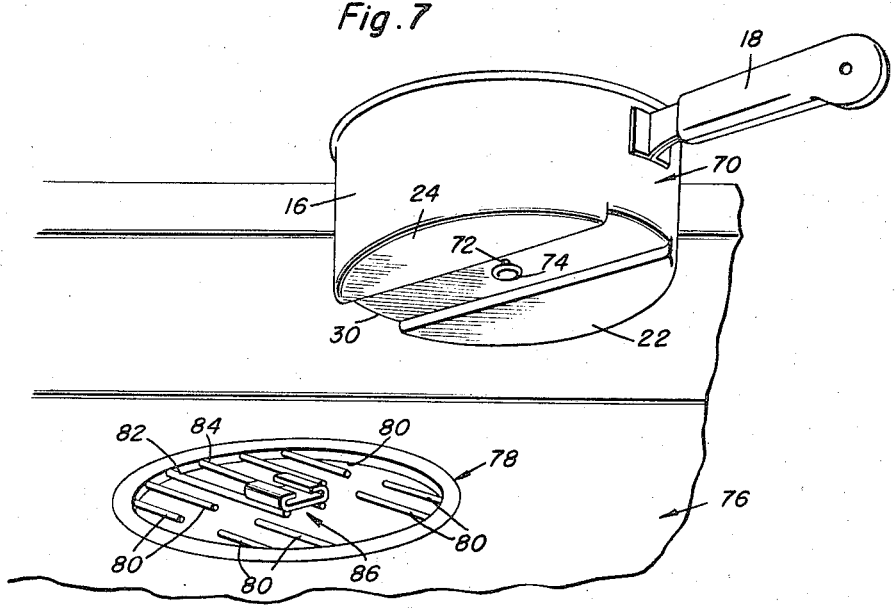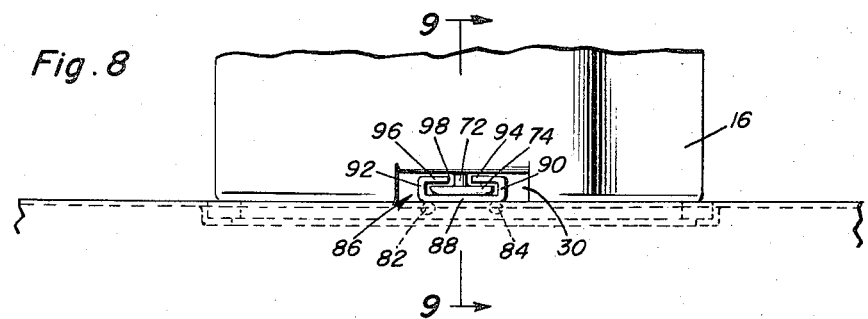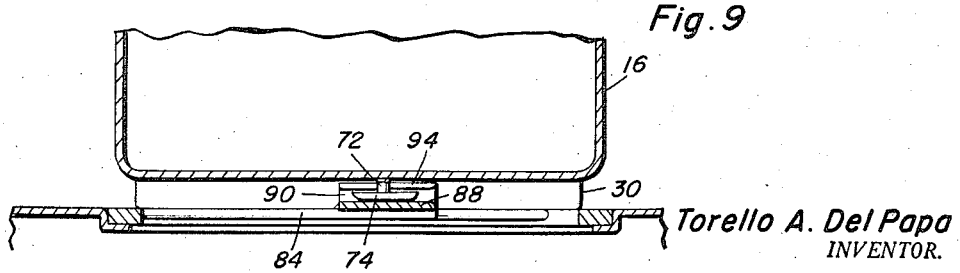

March 24, 1959 T. A. DEL PAPA 2,878,803
UTENSIL RETAINER STOVE GRILL
Filed Dec. 14, 1955 3 Sheets-Sheet 3
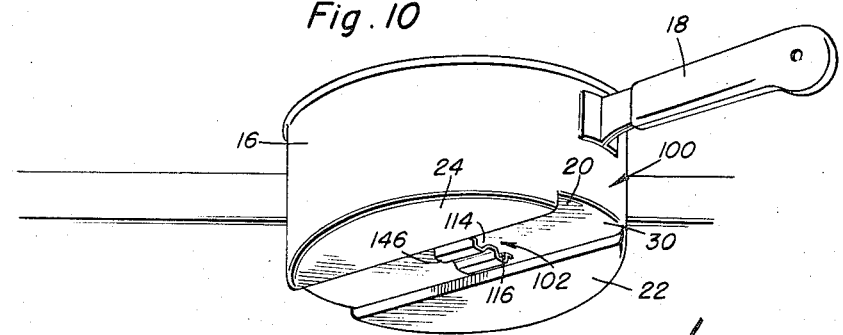
Fig. 10
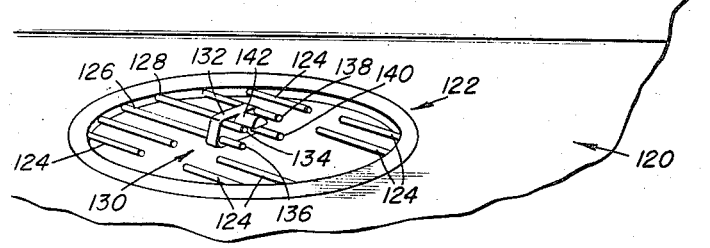
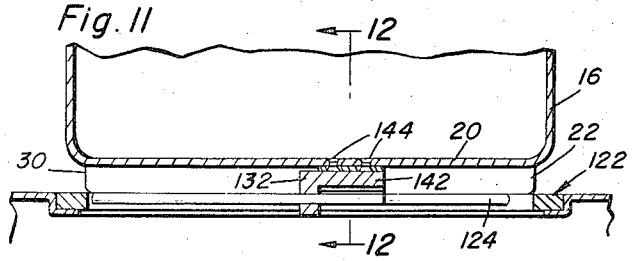
Fig. 11
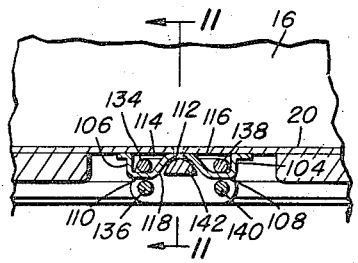
Fig. 12
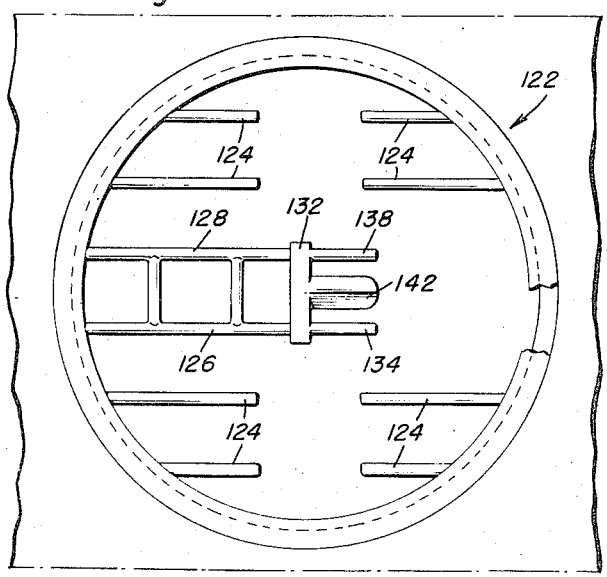
Fig. 13
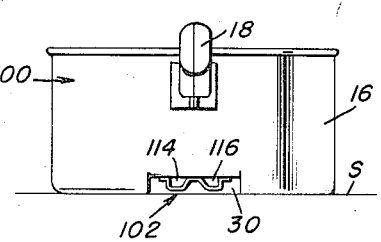
Fig. 14
Torello A. Del Papa
INVENTOR.
BY *Clarence A. O'Brien
and Harvey B. Jacobson*
Attorneys

United States Patent Office 2,878,803
Patented Mar. 24, 1959

2,878,803

UTENSIL RETAINER STOVE GRILL

Torello A. Del Papa, Galveston, Tex.

Application December 14, 1955, Serial No. 553,047

2 Claims. (Cl. 126—24)

This invention relates generally to retaining means for holding utensils on the grill of a range, being especially usable to prevent accidental tipping of the utensil in the kitchen by the housewife, children, etc., as well as being suitable in galleys, in marine vehicles, aircraft, trains, etc.

A primary object of the invention is to provide a utensil incorporating one portion of a securing assembly recessed in the bottom of said utensil, and a grill of a range incorporating another portion of the securing assembly which is detachably engageable with the portion of the utensil.

A further object of the invention in conformance with that set forth above is to provide a utensil including a substantially planar support bottom wherein said bottom includes a recessed securing member for interengagement with a cooperating member on the grill of a range.

A further object of the invention in conformance with that set forth above is to provide a cooperating range grill and utensil of the character set forth which is readily and economically manufactured, readily used, and highly utilitarian and acceptable for the purpose intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 7 is a perspective view of another embodiment of the invention;

Figure 8 is a fragmentary elevational view showing the utensil in position on the grill of the range;

Figure 9 is a sectional view taken substantially on the line 9—9 of Figure 8;

Figure 10 is a perspective view of another embodiment of the invention;

Figure 11 is a fragmentary sectional view taken substantially on the line 11—11 of Figure 12 showing the utensil in retained position upon a cooperating grill;

Figure 12 is a sectional view taken substantially on the line 12—12 of Figure 11;

Figure 13 is a top plan view of a grill cooperating with the utensil of Figure 10; and Figure 14 is an elevational view of the utensil looking toward the handle thereof.

Figure 1:
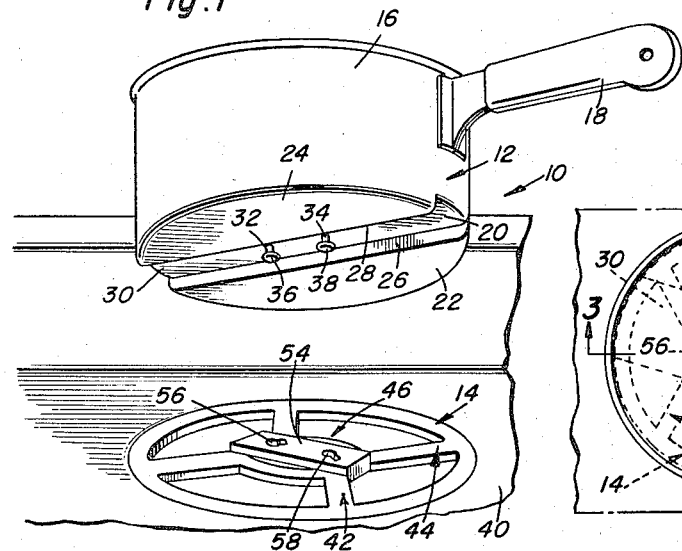
Figure 1 is a perspective view showing a fragmentary portion of a grill of a range with respect to the cooperating utensil.
Figure 2:
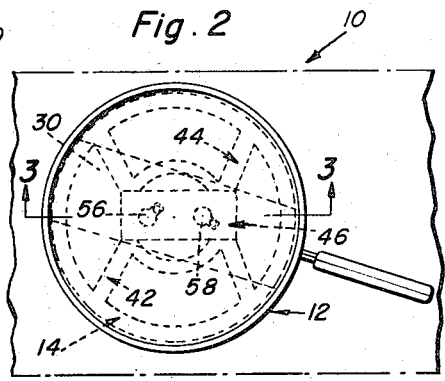
Figure 2 is a top plan view showing the utensil in position on the grill of the range.
Figure 3:
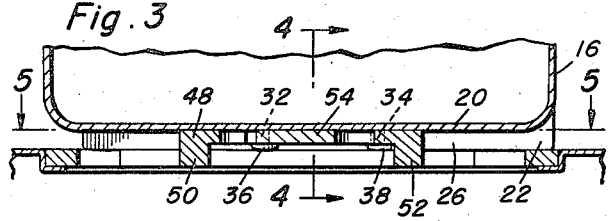
Figure 3 is an enlarged sectional view taken substantially on the line 3—3 of Figure 2.
Figure 4:
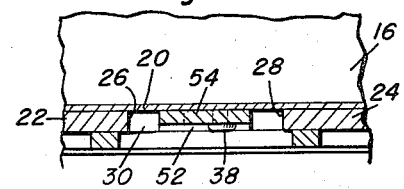
Figure 4 is a sectional view taken substantially on the line 4—4 of Figure 3.
Figure 5:
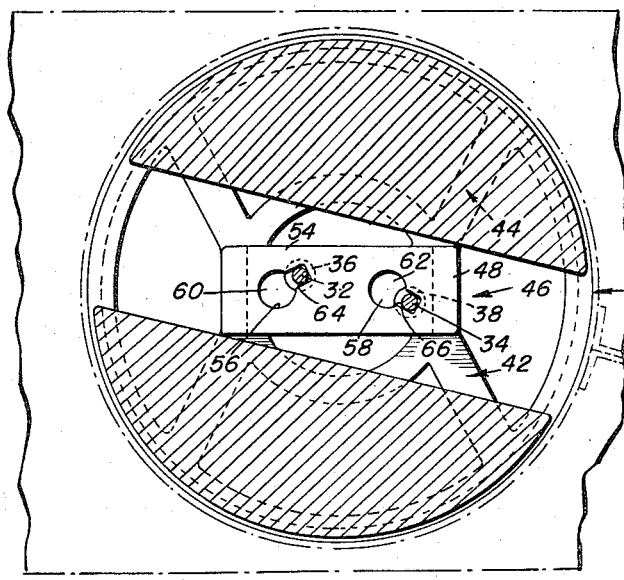
Figure 5 is a sectional view taken substantially on the line 5—5 of Figure 3.

Referring to Figures 1 through 6, the novel cooperating utensil and grill are indicated generally at 10, the utensil being indicated at 12 and the grill structure being indicated at 14.

The utensil 12 incorporates the usual side wall portion 16 having suitably secured thereto a laterally extending handle 18, the wall 16 being suitably formed with a bottom portion 20, the bottom portion having formed integrally therewith or suitably secured thereto a pair of arcuate segmental elements 22 and 24 which incorporate mutually parallel spaced inner edges 26 and 28, respectively, defining a diametrically extending recess portion 30 extending across the bottom of the utensil.

Suitably secured on the bottom 20 of the utensil are a pair of mutually parallel spaced retaining pin elements 32 and 34 which terminate within the recess portion 30 which include on the lower end portion thereof an enlarged transversely disposed flange portion 36 and 38, respectively.

Figure 6:
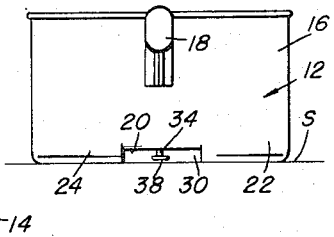
Figure 6 is an elevational view looking toward the handle of the utensil and showing the manner in which the utensil is readily supported on a support surface.

It will be noted in Figure 6 that although the bottom of the utensil is provided with the pin elements 32 and 34 inasmuch as they terminate within the recess 30 there is provided a substantially planar surface between the portions 22 and 24 for engagement on a support surface S.

The grill 14 is suitably secured on any conventional range indicated fragmentarily at 40, said grill being in overlying relationship to a burner element, not shown, and being constructed of any suitable material adaptable to the proper expansion and contraction characteristics normally encountered in such grill constructions.

The grill 14 includes radially extending support elements 42 and 44 of any suitable character upon which is suitably secured a mounting bracket element indicated generally at 46. The mounting bracket 46 incorporates an elongated plate 48 including side leg portions 50 and 52 suitably secured to the previously mentioned support elements 42 and 44, said leg portions 50 and 52 being secured to an intermediate web portion 54 which is of a smaller width than the distance between the bottom of the utensil and the annular portions 36 and 38 of the retaining pins 32 and 34, respectively.

The web 54 has extending therethrough longitudinally spaced keyhole portions or apertures 56 and 58 which include an enlarged portion 60 and 62, respectively, terminating in a laterally extending reduced diameter slot portion 64 and 66, respectively. The enlarged portions 60 and 62 are of a sufficient diameter to permit portions 36 and 38 to be inserted therein, and after such insertion the utensil is moved in a substantially sliding and rotary movement whereupon the pin elements 32 and 34 will be located in the respective slot portions 64 and 66, and thus the utensil will be secured on the grill and prevented from tilting or accidental spilling.

Considering Figures 7 through 9, the utensil is indicated generally at 70 and incorporates side walls 16, a suitably secured handle 18 and suitably secured segmental bottom portions 22 and 24 defining a diametrically extending recess portion 30 as in the embodiment of the invention of Figure 1. Suitably secured in a central portion within the recess 30 is a depending pin element 72 which includes on its lower portion a substantially enlarged annular transverse shoulder element 74.

A fragmentary portion of a range is indicated at 76 and includes thereon a suitable grill element indicated generally at 78.

The grill element 78 incorporates a plurality of suitably secured mutually parallel grill support elements 80, of any suitable character, and includes a central pair of grill support elements 82 and 84 which have secured thereon a securing member or bracket indicated generally at 86.

The securing bracket 86 includes an intermediate web portion 88 including a pair of mutually parallel upwardly extending flange portions 90 and 92, said flanges 90 and 92 including inwardly directed flange portions 94 and 96, respectively, which terminate short of each other defining a longitudinally extending slot portion 98. The flanges 94 and 96 overlie the web portion 88, and thus the pin element 72 together with the enlarged flange 74 are slidably inserted into the bracket element 86 whereupon the utensil 16 will be retained against accidental tipping although permitting to be readily removed therefrom.

Referring to Figures 10 through 14, the utensil is indicated generally at 100 incorporating a side wall portion 16, a suitably secured handle 18 and segmental bottom portions 22 and 24 defining a diametrically extending recessed portion 30.

Suitably secured within the recess portion 30 of the utensil 100 is a support member or connecting bracket indicated generally at 102. The bracket 102 extends longitudinally within a central portion of the recess 30 incorporating side flange portions 104 and 106 secured to the bottom 20 of the receptacle and depending therefrom, said flange portions 104 and 106 terminating in horizontally extending flange portions 108 and 110, respectively, which are secured to an intermediate upwardly extending web portion 112 suitably secured to the bottom 20 of the utensil. The flange portions 106 and 112 define a longitudinally extending bore portion 114 which is parallel to the second longitudinally extending bore portion 116 defined by the flange portions 104 and 112. It will be further noted that there is defined between the bore portions 114 and 116 a downwardly opening longitudinally extending groove 118 for a purpose to subsequently become apparent.

A fragmentary portion of a range is indicated at 120, said range incorporating a suitable grill indicated generally at 122, said grill including a plurality of mutually parallel support elements 124.

Located centrally on the support elements 126 and 128 of the grill is a support bracket assembly or member 130. The assembly 130 incorporates a vertically extending abutment or stop plate 132 to which are secured pairs of vertically spaced laterally extending support pin elements 134 and 136, and 138 and 140. Also secured on the plate 132 between the pins 134 and 138 is a laterally extending support pin 142, and as seen in Figure 12, the pins 134 and 138 extend through the bore portions 114 and 116, respectively, of the bracket 102 and the support element 142 extends within the downwardly opening recess 118 of said bracket 102. The pins 136 and 140 extend beneath the flange portions 110 and 108, respectively, when the utensil is placed on the grill and serve to prevent excessive tipping thereof. The bracket 102 may be suitably secured by means of rivet elements 144 extending through the bottom 20 in the flange portion 112 of said bracket element.

Thus it will be noted that a vertical plate portion 132 provides an abutment for the forward edge 146 of the bracket element 102 thus more or less orienting the utensil with respect to the grill 122.

From the preceding description the manner in which the invention is utilized is readily apparent, and accordingly further description in this respect is believed to be unnecessary.

Various positional directional terms such as "front," "rear," etc., are utilized here and have only a relative connotation to aid in describing the device and are not intended to require any particular orientation with respect to any external elements.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An interlocking grill and cooking utensil assembly comprising a utensil having a bottom provided with a substantially centrally disposed recess extending from side-to-side thereof presenting an elevated face spaced above said bottom and bounded by substantially parallel opposite side walls, a pair of pins depending from said elevated face in longitudinally spaced relation within said recess and each terminating at its lower end in an enlarged head, a cooking grill having an upwardly projecting retaining member for disposition within said recess, said retaining member including a generally rectangular, elevated and horizontal plate portion, said plate portion being of less thickness than the lengths of said pins above the enlarged head portions thereof, said plate portion being provided with a pair of keyhole apertures therein, said keyhole apertures having enlarged portions spaced longitudinally apart corresponding to the spacing between said pins and slot portions extending therefrom angularly in laterally opposite directions toward the opposite sides of said plate portion, said plate portion being of materially less width than the width of said recess with said pins and the enlarged portions of said keyhole apertures being so disposed as to position said plate portion substantially equidistantly between the opposite side walls of said recess when said pins are initially engaged through said enlarged portions of the keyhole apertures and so as to permit relative rotation between the utensil and grill to engage diametrically opposed corners of said plate portion against the opposite side walls of said recess and force said pins within said slot portions of the keyhole apertures.

2. In combination, a horizontally disposed range grill, an utensil to be supported on said grill, and a securing assembly extending between said grill and the bottom of said utensil, said securing assembly comprising a pair of interlocking securing means, one of which is secured to the bottom of the utensil, the other of which is secured to said grill, the utensil including a diametrically disposed recess portion in the bottom of the utensil, the securing means on the bottom of the utensil being supported in depending relation within the recess and terminating above the bottom of the utensil providing a substantially planar support surface for the utensil, and the securing means on the grill extending upwardly from the grill for interengagement with said securing means on the utensil, said securing means on the utensil comprising a pair of vertically depending pin element terminating within the recess portion of the utensil, one end of each pin element being secured to the bottom of the utensil, and an enlarged transverse flange element secured on the upper end of each pin element, the securing means on the grill comprising an upwardly projecting element of less width than said recess portion and having a web portion extendible within the recess portion of the utensil, said web portion having a vertical dimension less than the length of the pin elements, and a pair of spaced keyhole aperture portions extending vertically through the web portion and including an enlarged portion accommodating the insertion of the pin elements and transverse flange elements therethrough, the keyhole aperture portions including a lateral slot portion in communication with the enlarged portions thereof, said lateral slot portion being of a width greater than the width of the pin elements and less than the width of the flange elements on said pin elements.

References Cited in the file of this patent

UNITED STATES PATENTS

| | | |
|---|---|---|
| 386,749 | Johnson | July 24, 1888 |
| 1,583,076 | Litter | May 4, 1926 |
| 2,088,320 | De Vries | July 27, 1937 |
| 2,187,426 | Kuhnel | Jan. 16, 1940 |
| 2,517,018 | Nicholson | Aug. 1, 1950 |
| 2,664,490 | Allgeyer | Dec. 29, 1953 |
| 2,682,831 | Pellegrin | July 6, 1954 |